United States Patent [19]

Heinrich

[11] Patent Number: 4,878,398

[45] Date of Patent: Nov. 7, 1989

[54] DRIVING DEVICE FOR WINDOW WIPER OF MOTOR VEHICLES

[75] Inventor: Laurent Heinrich, Strasbourg, France

[73] Assignee: Robert Bosch GmbH, Stuttgart, Fed. Rep. of Germany

[21] Appl. No.: 252,440

[22] Filed: Sep. 30, 1988

[30] Foreign Application Priority Data

Oct. 10, 1987 [DE] Fed. Rep. of Germany ....... 3734392

[51] Int. Cl.$^4$ .............................. F16C 3/04; B60S 1/04
[52] U.S. Cl. ......................................... 74/959; 74/600; 74/42; 74/526; 74/70; 15/250.13; 15/250.16; 15/250.31
[58] Field of Search ................... 74/526, 595, 42, 600, 74/40, 70, 51, 75, 527, 96; 15/250.13, 250.16, 250.31, 250.17

[56] References Cited

U.S. PATENT DOCUMENTS

| | | | |
|---|---|---|---|
| 3,226,755 | 1/1966 | Fox et al. ...................... | 15/250.16 X |
| 3,570,039 | 3/1971 | Ichinose et al. .................. | 15/250.13 |
| 4,597,129 | 7/1986 | Eustache et al. ................. | 15/250.16 |
| 4,610,046 | 9/1986 | Buschur et al. ..................... | 74/70 X |
| 4,651,583 | 3/1987 | Suzuki .............................. | 74/526 X |
| 4,720,885 | 1/1988 | Leroy et al. ..................... | 15/250.31 X |
| 4,741,067 | 5/1988 | Jambor et al. ................... | 15/250.16 |
| 4,765,018 | 8/1988 | Buchanan ........................ | 15/250.13 |
| 4,787,114 | 11/1988 | Okudaira ............................ | 74/42 X |
| 4,798,102 | 1/1989 | Buschur et al. ..................... | 74/600 |

FOREIGN PATENT DOCUMENTS

| | | | |
|---|---|---|---|
| 3121626 | 12/1982 | Fed. Rep. of Germany ........ | 74/595 |
| 3734814 | 5/1988 | Fed. Rep. of Germany ... | 15/250.16 |
| 2607765 | 6/1988 | France .............................. | 15/250.16 |

Primary Examiner—Vinh Luong
Attorney, Agent, or Firm—Michael J. Striker

[57] ABSTRACT

The driving mechanism for a wiper of a motor vehicle includes a reversible drive shaft, a two part crank whose one part is secured to the drive shaft and whose other part is linked to the wiper to oscillate the same when the drive shaft rotates in one direction. To displace the wiper into rest position outside its wiping field when the wiping operation is switched off, there is provided a control plate rotatable about the drive shaft and supporting a swing lever provided with a lock pawl. The drive shaft passes through a cylindrical support fixed to the frame of the motor vehicle and being provided on its jacket with an indentation for receiving the lock pawl. The control plate and the first crank part are provided respectively with guiding cams cooperating with cam followers provided on the swing lever and on the second crank part to bring the lock pawl into engagement with the indentation when the drive shaft reverses its direction and to displace a crank pin formed on the second crank part radially outwardly with respect to its orbiting circular path when the drive shaft rotates in the one direction for normal wiping operation.

10 Claims, 3 Drawing Sheets

DRIVING DEVICE FOR WINDOW WIPER OF MOTOR VEHICLES

BACKGROUND OF THE INVENTION

The present invention relates to a driving device for a window wiper of a motor vehicle including a crank assembled of two crank parts hinged one to the other, one of the crank parts being fixedly connected to a reversible drive shaft and the other crank part being provided with a crank pin, a coupling rod hinged at one end thereof to the crank pin and at the other end thereof to a rocking lever which is linked to at least one wiper blade to impart thereto an oscillatory movement in a wiping field when the drive shaft turns in one direction; a control plate supported for rotation about the drive shaft and being provided with a guiding cam cooperating with a cam follower secured to the other cam part; a lock pawl pivotably mounted on the control blade to engage upon the reversal of the direction of rotation of the drive shaft, an indentation fixedly mounted on a frame of the motor vehicle; the crank being provided with another guiding cam cooperating with a cam follower on the lock pawl to displace the same into a locking position in which the control plate is locked and the other cam follower upon the reversal of the direction of rotation of the control shaft is rotated relative to the one crank part in such a manner that the crank pin is displaced outwardly away from the axis of rotation of the drive shaft and forces the wiper into a rest or parking position outside the wiping field.

A wiper driving device of this kind is known from the DE-OS No. 31 21 626 wherein the guiding cam has a radial component only and consequently the change in length of the articulated two part crank is initiated immediately after the reversal of the rotational direction of the driving shaft. As a result, the lock pawl is drawn near to its locking position before being actually situated opposite the corresponding locking indentation fixed to the frame of the vehicle. Therefore, such a prior art arrangement requires a high degree of manufacturing or installation precision and accordingly high manufacturing and installation costs result.

SUMMARY OF THE INVENTION

It is, therefore, a general object of the present invention to overcome the aforementioned disadvantage.

More particularly, it is an object of the invention to provide an improved driving mechanism for window wipers in which a guiding cam starts moving a lock pawl into its locking position only then when the pawl is situated opposite its locking indentation.

In keeping with this object and others which will become apparent hereinafter, one feature of the invention resides in the provision of a first S-shaped cam on the one crank part being secured to the drive shaft and of a second S-shaped cam on the control plate, the first S-shaped cam having one curved section directed outwardly away from the fixed locking indentation to displace the lock pawl out of engagement with the indentation when the drive shaft rotates in the one direction, and another curved section whose radius of curvature intersects the center axis of the drive shaft to guide the lock pawl in engagement with the indentation when the drive shaft rotates in a reverse direction; and a second S-shaped cam being formed on the control plate and cooperating with a cam follower on the other crank part; the other or second S-shaped cam having one curved section whose radius of curvature intersects the center axis of the drive shaft to guide the crank pin on a circular orbiting path when the drive shaft rotates in the one direction, and another curved section directed outwardly away from the orbiting path to guide via the crank pin the wiper blade into a rest position outside the wiping field when the drive shaft rotates in the reverse direction.

In this manner, the manufacturing and installation tolerances of the driving mechanism can be considerably increased without negatively influencing operation of the mechanism. In the preferred embodiment, the S-shaped cams are in the form of edges of S-shaped openings provided respectively on the one of the crank parts and on the control plate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
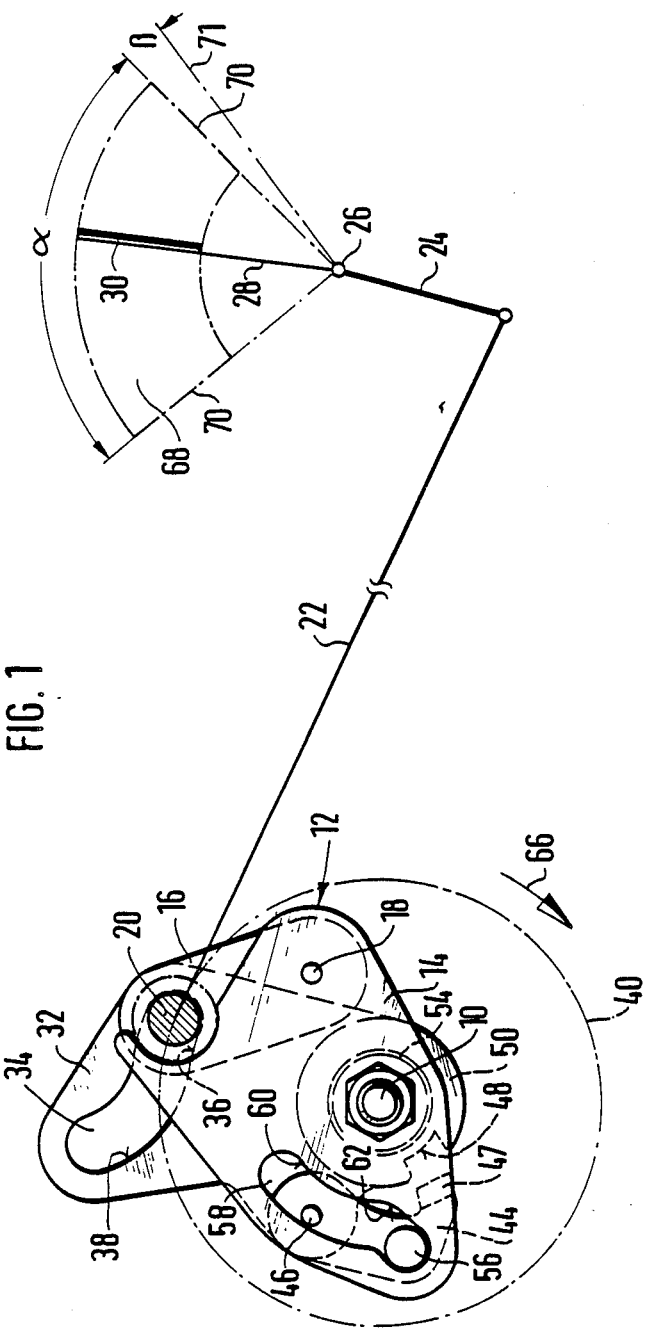
FIG. 1 is a top view of an embodiment of the wiper driving mechanism of this invention shown in a position for oscillating a schematically illustrated wiper blade.
Figure 3:
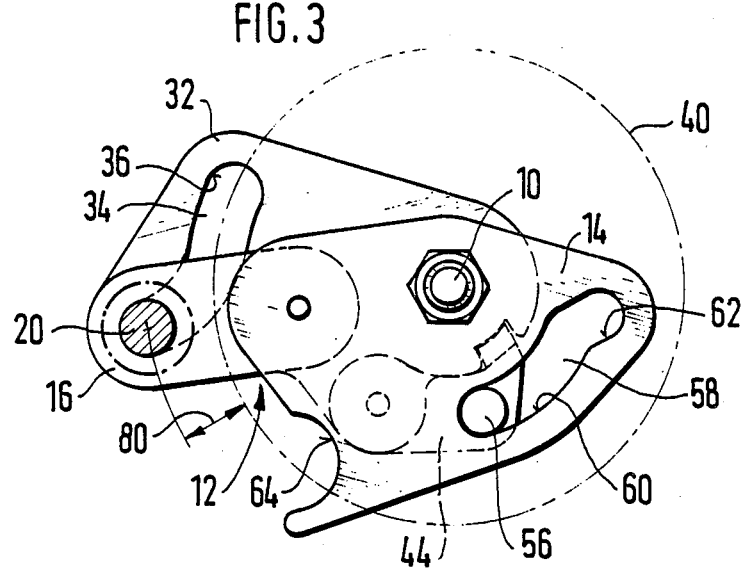
FIG. 3 shows the mechanism of FIG. 2 in its rest or stop position in which the wiper blade is inactive.
Figure 4:
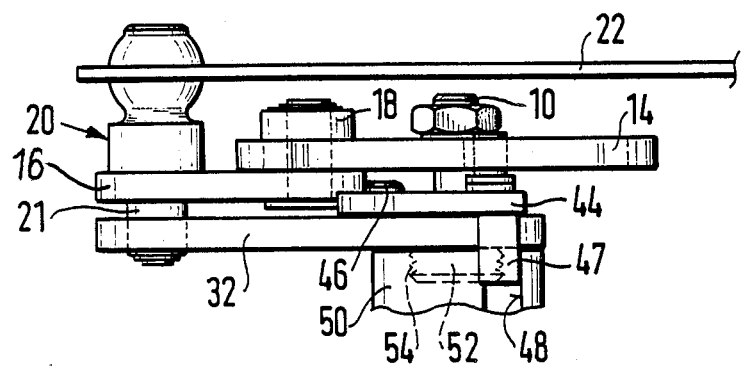
FIG. 4 is a side view of the mechanism of this invention in the position of FIG. 3.

The driving mechanism according to FIG. 1 includes a non-illustrated electric driving motor pertaining to a reversible driving unit having a driving shaft 10 on which a crank part of a two part crank 12 is secured. The two crank parts 14 and 16 are linked one to the other by a hinge 18. A crank pin 20 is fixed on an end portion of the second link part 16 remote from the hinge 18. The crank pin is a component part of a crank mechanism consisting of the articulated crank 12, coupling rod 22 hinged at one end thereof to the crank pin 20 and at the other end thereof to a rocking lever 24. The plate-shaped first crank part 14 is rigidly connected with the reversible driving shaft 10. The end of the rocking arm 24 remote the coupling rod 22 is supported for rotation on a wiper shaft 26 and is secured to a wiper arm 28 supporting a wiper blade 30. A control plate 32 is supported for rotation about the drive shaft 10. The drive shaft passes through a bore in the control plate 32 to rotate independently of the rotation of the latter. End portion of the control plate 32 remote from the driving shaft is provided with a curved opening 34 whose edge acts as a guiding cam for a cam follower pin 21 fixed to the second crank part 16 as a prolongation of the crank pin 20. The guiding cam 34 as seen from FIG. 1 has an S-shaped configuration consisting of a first curved section 36 whose radius of curvature intersects the center axis of the drive shaft 10 and accordingly section 36 extends concentrically to the latter. The curved section 36 has an end portion 38 which is directed radially outwardly relative to the axis of rotation of the drive shaft 10 and extends beyond a circular orbit 40 (indicated by a dash and dot line) of crank pin 20. The arrangement of the plate-shaped component 32 relative to the other components of the mechanism is seen in FIG. 4. The first crank part 14 is fixedly connected to the drive shaft 10. Hinge 18 links the second crank part 16 with the first crank part 14. The prolongation 21 of the crank pin 20 passes through the second crank part 16 to form a cam follower engaging the guiding cam 34 in the control plate 32. It will be seen from FIG. 4 that a lever 44 is swingably supported by means of a link 46 on the control plate 32 to move in the spacing between the control plate and the first crank part 14. The lever 44 has its free end provided with a downwardly directed lock pawl 47 cooperating with an indentation 48 formed in the jacket of a cylindrical supporting element 50 fixed to a frame of the motor vehicle and acting as a bearing for the drive shaft 10. A threaded bushing 52 is secured to the control plate 32 around its bore for the drive shaft 10. The outer thread 54 of the bushing 52 is screwed into a threaded recess in the cylindrical support 50. As illustrated in FIG. 4, the thread bushing 52 is screwed into the threaded well 54 until the lower side of control plate 32 is abutment with the end face of the cylindrical support 50. The swing lever 44 is a one arm lever provided with a slide stone 56 located between the lock pawl 47 and the hinge 46. The cam follower 56 projects into a guiding opening 58 in the first crank part 14. The S-shaped guiding edge of the opening 58 defines a first curved section 60 extending concentrically with the axis of rotation of the drive shaft 10. A curved end section 62 following the section 60 is directed outwardly away from the drive shaft 10. Referring again to FIG. 1, it will be seen in the illustrated operating position of the drive mechanism the crank pin 20 is in abutment with a stop recess in a shoulder 64 (FIG. 3) of the first crank part 14.

Figure 2:
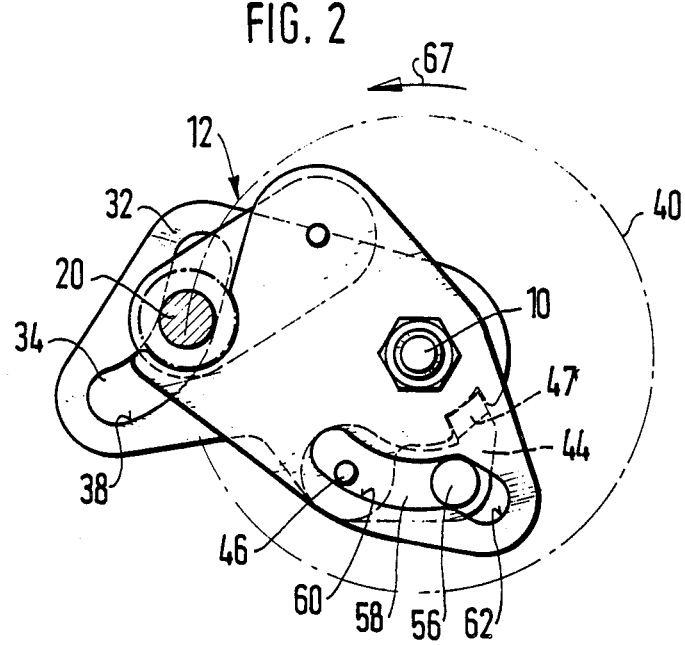
FIG. 2 shows the driving mechanism of FIG. 1 in a position in which the direction of rotation of its driving shaft has been reversed and the mechanism is approaching its rest position.

During the wiping operation the crank 12 rotates in the direction of arrow 66 whereby the crank pin 20 orbits on the circular path 40. Due to the linkage via the coupling rod 22 the rotary movement of the crank 12 is transmitted to the wiper arm 28 with the wiper blade 30 such that the latter 20 performs a swinging or oscillating movement in a wiping field 68 extending over an angle α. Accordingly, the wiping field 68 in the form of a circular segment is limited at both sides by reversing positions 70 of the wiper blade 30. However, when the driving mechanism is stopped, the wiper blade 30 is to be brought into its rest or parking position 71 which is shifted by an angle β beyond the wiping field 68. For this purpose, the direction of rotation of the drive shaft 10 is reversed so that the crank 12 rotates counterclockwise in the direction of arrow 67 (FIG. 2). In the course of the counterclockwise rotation of the shaft the threaded bushing 52 is screwed in the threaded well of the cylindrical support 50 by about half a rotation of the drive shaft until it is in full abutment against the end face of the cylindrical support 50 (FIG. 4) and is brought to a full stop. At the same time, the cam follower 21 starts shifting in the curved opening 34 of the control plate 32 along the curved section 36 which is concentric with he drive shaft 10, and simultaneously the cam follower 56 of the swing lever 44 is shifted in the guiding opening 58 along its radially directed end section 62. At the moment when the cam follower 56 reaches the curved section 60 of the opening 58 which is concentric with the drive shaft 10, the cam follower 20 reaches the curved section 38 in the guiding opening 34 which is directed outwardly away from the drive shaft 10. At this moment, the swing lever 44 is rotated about its link 46 relative to the control plate 32 until its lock pawl 47 enters the indentation 48 in the jacket of the cylindrical support 50. During the screwing in process of the threaded bushing 52 into the cylindrical support 50 the swing lever 44 and hence its lock pawl 47 are brought into a position relative to the indentation 48 in which the lock pawl 47 can engage the indentation without any obstruction. Upon a further rotation of the crank 12 in the direction of arrow 67, the cam follower 56 is guided in the concentric cam section 60 and consequently no movement is imparted to the swing lever 44. In contrast, the cam follower 21 is guided in the outwardly directed cam section 38 of the guiding opening 34 and accordingly the second crank part 60 is swung about its hinge 18 into a position shown in FIG. 3 in which the crank pin 20 is displaced away from the first crank part 14. In the end position shown in FIG. 3, the crank pin 20 is spaced apart from the orbit line 40 by a distance indicated by arrow 80. Accordingly, the crank 12 is extended in length by the distance 80 whereby the center axis of the crank pin 20, of the pivot link 18 and of the drive shaft 10 extend parallel to each other substantially on a straight line. Due to the extension of the length of the crank by the distance 80 the swinging range of the rocking arm 24 is increased by an angle β and the wiper blade 30 is transported into its predetermined rest position 71.

A similar arrangement is known from the afore mentioned German publication DE-OS No. 31 21 626.

When it is desired to set the wiper device back into operation, the drive shaft 10 is turned on to rotate clockwise in the direction arrow 66 (FIG. 1). At first a relative movement between the first crank part 14 and the control plate 32 takes place whereby the cam follower 56 on the swing lever 44 is initially moved in the concentric curved section 60 of the guiding opening 58. At the same time, the cam follower 21 in the curved opening 34 starts shifting along the radially offset cam section 38 clockwise and turns the second crank part 16 about its hinge 18 into its retracted position relative to the first crank part 14 until the crank pin 20 is returned into its circular orbit 40. In this position, the cam follower 56 on swing lever 44 is near the tangentially directed cam edge 62 of the guiding opening 58. Upon a further clockwise rotation of the drive shaft 10, the cam follower 21 reaches the concentric cam section 36 coinciding with the orbit circle 40 while the cam follower 56 on the swing lever 44 reaches the tangentially directed section 62 in the guiding opening 58. Accordingly, the swing lever 44 is swung clockwise and lock pawl 47 is disengaged from the indentation 48 in the cylindrical support 50. In this instant, the drive mechanism is in its operating position illustrated in FIG. 1 in which the abutment recess 64 in the shoulder of the first crank part 14 is brought into engagement with the crank pin 20 and drives the same along its circular orbit path 40. The above described rotary movements of the crank parts 14 and 16 release also the positive stop between the end face of the cylindrical support 50 and the control plate 32 so that the latter is again unscrewed by a half winding in the threaded well in the support 50, the lock pawl 47 is shifted relative to its indentation and the wiper device continues its normal operation.

The positive stop of the control plate 32 on the end face of the cylindrical support 50 can be also made by different means differing from the above described embodiment.

Figure 5:
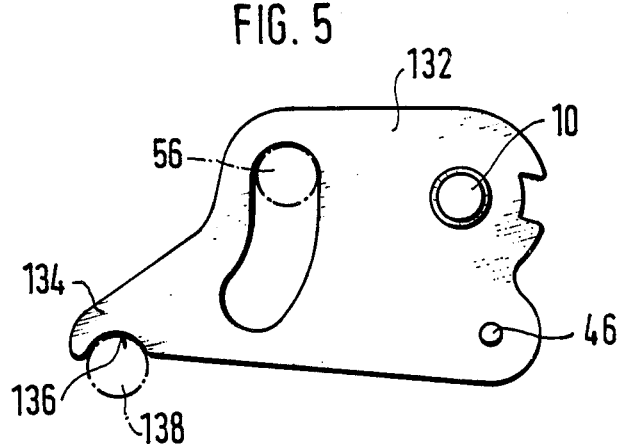
FIG. 5 a top view of another embodiment of a control plate in the mechanism of this invention.

In the embodiment according to FIG. 5 the control plate 132 is formed with a projecting shoulder 134 oriented away from the bore for the drive shaft 10. The shoulder 134 has a recess 136 matching a jacket of a cylindrical armature 138 indicated by dash and dot line of a solenoid 138. When it is desired to stop the operation of the wiper blade 30 and set the same into its rest position 71, the clockwise rotation of the drive shaft is reversed in the direction of arrow 67 and simultaneously the armature 138 of the solenoid is brought in the path of movement of the shoulder 134 so that the control plate 132 is immediately stopped. Accordingly the wiper blade 30 can be brought into its rest position 71 without any delay because the control plates 132 need not be screw driven against a fixed abutment surface. The solenoid is actuated only momentarily and can be immediate turned off inasmuch as the locking of the control plate 132 is no longer necessary. Upon the reactivation of the wiper device into its normal operation the solenoid remains switched off because in this case the movement of the control plate is identical with that of the first described exemplary embodiment.

In a further modification it is conceivable that the plate like component part 132 be held in a fixed position by means of spring and the like. It is only essential that the control plate be fixed when the crank performs its return movement for prolongating its effective length and simultaneously for locking the control plate 32 to the support hub 50 fixed to a vehicle frame.

While the invention has been illustrated and described as embodied in specific examples of the driving mechanism for window wipers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A driving mechanism for a window wiper of a motor vehicle, comprising a cylindrical support fixed to a frame of the motor vehicle and having an indentation in its jacket; a reversible drive shaft arranged for rotation coaxially with said cylindrical support; a crank assembled of two crank plates hinged one to the other; one of said crank plates being secured to said reversible drive shaft and having a first S-shaped cam, and the other crank plate being provided with a crank pin and an oppositely directed first cam follower; a coupling rod hinged at one end thereof to said crank pin and at the other end thereof to a rocking lever for oscillating a wiper blade in a wiping field when the drive shaft rotates in one direction; a control plate supported for rotation about said drive shaft and having a second S-shaped cam cooperating with said first cam follower; means for locking said control plate in a fixed position relative to said cylindrical support when said drive shaft rotates in a reverse direction; a lock pawl pivotably mounted on said control plate and having a second cam follower cooperating with said first S-shaped cam; said first S-shaped cam having one cam section extending concentrically with said drive shaft to guide said lock pawl in engagement with said indentation when said drive shaft rotates in the reverse direction, and another cam section extending in a tangential direction away from said cylindrical support to guide said lock pawl out of engagement with said indentation when said drive shaft rotates in said one direction; and said second S-shaped cam having one cam section extending concentrically with said drive shaft to guide said crank pin on a circular orbiting path when said drive shaft rotates in the one direction, and another cam section directed outwardly away from said orbiting path to guide via said crank pin said wiper blade into a rest position outside said wiping field when the drive shaft rotates in the reverse direction.

2. A driving mechanism as defined in claim 1 wherein said first and second S-shaped cams are formed by edges of guiding openings provided respectively in said one crank plate and said control plate.

3. A driving mechanism as defined in claim 1 wherein said concentrically extending cam sections of said first and second S-shaped cams are leading sections when viewed in said one direction of rotation of said drive shaft.

4. A driving mechanism as defined in claim 3 wherein said first and second S-shaped cams are situated in such locations of said one crank plate and said control plate that the cam follower on said other crank plate engages said other cam section of said second S-shaped cam when said second cam follower is engaged with said other cam section of said first S-shaped cam.

5. A driving mechanism as defined in claim 4 wherein said lock pawl is in the form of a one-armed lever hinged at one end thereof on said control plate to swing about an axis and having at its free end a downwardly directed locking element for engaging said indentation, and said second cam follower being in the form of a slide stone arranged between said axis and said locking element and extending in opposite direction than said locking element.

6. A driving mechanism as defined in claim 5 wherein said cylindrical support is provided with a bushing acting as a bearing for said drive shaft and said indentation being formed in said bushing.

7. A driving mechanism as defined in claim 6 wherein said locking means stop said control plate in a position in which said lock pawl is juxtaposed with said indentation.

8. A driving mechanism as defined in claim 5 wherein said locking means include a threaded bushing surrounding said drive shaft and being secured to said control plate, and a threaded recess formed in an end face of said cylindrical support and engaging said threaded bushing.

9. A driving mechanism as defined in claim 5 wherein said locking means include an abutment shoulder formed on said control plate and a solenoid operated stop element which is displaced into the path of movement of said abutment shoulder when the drive shaft starts rotating in said reverse direction.

10. A driving mechanism as defined in claim 1 wherein said first crank plate is formed with an abutment shoulder for contacting said crank pin and driving the same on said circular orbiting path when said drive shaft rotates in said one direction.

* * * * *